United States Patent
Ko et al.

(10) Patent No.: US 6,912,672 B2
(45) Date of Patent: *Jun. 28, 2005

(54) METHOD OF VERIFYING DEFECT MANAGEMENT AREA INFORMATION OF DISC AND TEST APPARATUS FOR PERFORMING THE SAME

(75) Inventors: Jung-wan Ko, Yongin (KR);
Hyun-kwon Chung, Kyungki-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 682 days.

This patent is subject to a terminal disclaimer.

(21) Appl. No.: 09/805,446

(22) Filed: Mar. 14, 2001

(65) Prior Publication Data

US 2001/0033539 A1 Oct. 25, 2001

Related U.S. Application Data

(60) Provisional application No. 60/195,470, filed on Apr. 10, 2000.

(30) Foreign Application Priority Data

Apr. 8, 2000 (KR) ........................ 2000-18507

(51) Int. Cl.[7] .............................................. G06F 11/00
(52) U.S. Cl. ........................ 714/42; 714/41; 369/47.17; 369/53.17
(58) Field of Search .......................... 714/41, 42, 735, 714/769; 369/47.17, 53.17, 53.12, 53.42, 47.14

(56) References Cited

U.S. PATENT DOCUMENTS

| | | | |
|---|---|---|---|
| 5,404,357 A | | 4/1995 | Ito et al. |
| 5,432,801 A | * | 7/1995 | Hepler ....................... 714/755 |
| 5,530,687 A | | 6/1996 | Yamaguchi |
| 5,586,127 A | * | 12/1996 | Moriuchi ..................... 714/769 |
| 6,370,658 B2 | * | 4/2002 | Jeong .......................... 714/25 |
| 6,457,156 B1 | * | 9/2002 | Stenfort ...................... 714/785 |
| 6,526,522 B1 | * | 2/2003 | Park et al. ...................... 714/8 |
| 6,564,345 B1 | | 5/2003 | Kang et al. |
| 6,571,204 B1 | * | 5/2003 | Meyer ......................... 703/22 |
| 6,621,782 B1 | * | 9/2003 | Nakane et al. ............. 369/53.1 |

FOREIGN PATENT DOCUMENTS

| | | |
|---|---|---|
| EP | 0 281 408 | 9/1988 |
| WO | WO 01/22416 | 3/2001 |

OTHER PUBLICATIONS

U.S. Appl. No. 09/805,443, filed Mar. 14, 2001, Jung Wan Ko et al., Samsung Electronics Co., Ltd.
U.S. Appl. No. 09/805,437, filed Mar. 14, 2001, Jung Wan Ko et al., Samsung Electronics Co., Ltd.
U.S. Appl. No. 09/805,436, filed Mar. 14, 2001, Jung Wan Ko et al., Samsung Electronics Co., Ltd.
U.S. Appl. No. 09/805,447, filed Mar. 14, 2001, Jung Wan Ko et al., Samsung Electronics Co., Ltd.

(Continued)

*Primary Examiner*—Nadeem Iqbal
*Assistant Examiner*—Timothy M. Bonura
(74) *Attorney, Agent, or Firm*—Stein, McEwen & Bui, LLP

(57) ABSTRACT

A method of verifying that a disc recording and reproducing apparatus normally analyzes defect management area (DMA) information in a read or write mode, and a test apparatus for performing the method. The method includes operating the recording and reproducing apparatus in a read or write mode, using a test disc with test reference information, and checking whether the recording and reproducing apparatus operates in the read or write mode to verify the DMA information analyzing function of the recording and reproducing apparatus. Accordingly, a DMA information analyzing function of the disc recording and reproducing apparatus in the read or write mode can be tested.

45 Claims, 5 Drawing Sheets

OTHER PUBLICATIONS

U.S. Appl. No. 09/805,439, filed Mar. 14, 2001, Jung Wan Ko et al., Samsung Electronics Co., Ltd.
U.S. Appl. No. 09/805,438, filed Mar. 14, 2001, Jung Wan Ko et al., Samsung Electronics Co., Ltd.
U.S. Appl. No. 09/805,448, filed Mar. 14, 2001, Jung Wan Ko et al., Samsung Electronics Co., Ltd.
U.S. Appl. No. 09/805,444, filed Mar. 14, 2001, Jung Wan Ko et al., Samsung Electronics Co., Ltd.

ECMA: Standardizing Information and Communication Systems: "120mm DVD Rewritable Disk (DVD–RAM)," Standard ECMA–272, 2nd Edition, Jun. 1999, pp 1–99.

* cited by examiner

FIG. 1
PRIOR ART

| DMA1 | DDS |
| | PDL |
| | SDL |
| RESERVED | |
| DMA2 | DDS |
| | PDL |
| | SDL |
| RESERVED | |
| USER DATA AREA | |
| RESERVED | |
| DMA3 | DDS |
| | PDL |
| | SDL |
| RESERVED | |
| DMA4 | DDS |
| | PDL |
| | SDL |
| RESERVED | |

FIG. 3

| Class | Items | | Byte Position | of bytes | Expected value | |
|---|---|---|---|---|---|---|
| DDS | DDS Identifier | | 0 to 1 | 2 | 0A0Ah | |
| | reserved | | 2 | 1 | 00h | |
| | Disc Certification flag | | 3 | 1 | b7 | 0b |
| | | | | | b6-b2 | All 0b |
| | | | | | b1 | 1b |
| | | | | | b0 | X |
| | DDS/PDL update counter | | 4 to 7 | 4 | M+k | |
| | Number of Groups | | 8 to 9 | 2 | 00018h | |
| | Number of zones | | 10 to 11 | 2 | 0023h | |
| | reserved | | 12 to 79 | 68 | All 00h | |
| | Location of Primary spare area | | 80 to 87 | 8 | b63-b56 | 00h |
| | | | | | b55-b32 | 031000h |
| | | | | | b31-b24 | 00h |
| | | | | | b23-b0 | 0341FFh |
| | Location of LSN0 | | 88 to 91 | 4 | b31-b24 | 00h |
| | | | | | b23-b0 | - |
| | reserved | | 92 to 255 | 164 | All 00h | |
| | Start LSN for each zone | Zone1 | 256 to 259 | 140 | b31-b24 | 00h |
| | | | | | b23-b0 | - |
| | | Zone2 | 260 to 263 | | b31-b24 | 00h |
| | | | | | b23-b0 | - |
| | | ... | ... | | ... | ... |
| | | Zone34 | 392 to 395 | | b31-b24 | 00h |
| | | | | | b23-b0 | - |
| | reserved | | 396 to 2047 | 1652 | All 00h | |

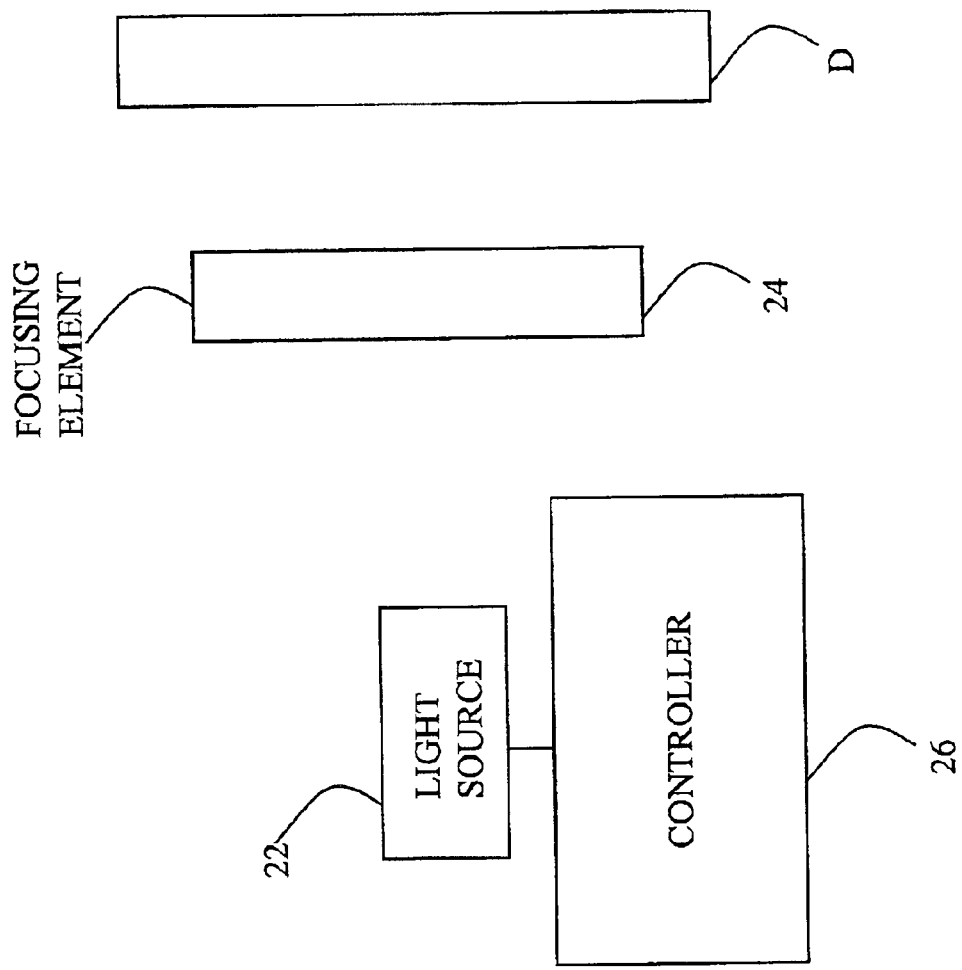

METHOD OF VERIFYING DEFECT MANAGEMENT AREA INFORMATION OF DISC AND TEST APPARATUS FOR PERFORMING THE SAME

CROSS-REFERENCE TO RELATED APPLICATIONS

This application claims the benefit of Korean Application No. 00-18507, filed Apr. 8, 2000, in the Korean Patent Office and U.S. Provisional Application No. 60/195,470, filed Apr. 10, 2000 in the U.S. Patent & Trademark Office, the disclosures of which are incorporated herein by reference.

BACKGROUND OF THE INVENTION

1. Field of the Invention

The present invention relates to an apparatus which can record information on and reproduce information from a recordable and reproducible disc, and more particularly, to a method of verifying that a disc recording and reproducing apparatus normally generates or updates defect management area (DMA) information of a disc, and a test apparatus for performing the same.

2. Description of the Related Art

A recordable and reproducible disc is an optical disc, which information is recorded on and reproduced from using a laser, for example, a digital versatile disc random access memory (DVD-RAM). A DVD-RAM is a rewritable disc. According to "DVD Specifications for Rewritable Disc Part 1 Physical Specifications Version 2.0," a DVD-RAM includes four DMAs, i.e., DMA1, DMA2, DMA3 and DMA4, on each side thereof for managing the defects thereon.

As shown in FIG. 1, DMA1 and DMA2 are located in a lead-in area near the inner diameter of a disc, and DMA3 and DMA4 are located in a lead-out area near the outer diameter of the disc. Each DMA is followed by a reserved sector.

A disc definition structure (DDS), a primary defect list (PDL) and a secondary defect list (SDL) are stored in the DMA. A DDS includes information on the format structure of a disc, for example, a disc certification flag, a DDS/PDL update counter and a start logical sector number of each zone. A PDL includes information on all defective sectors detected on the disc during initialization of the disc. An SDL includes information on the sector number of each first sector in defective blocks (error-correction code (ECC) blocks) occurring while the disc is in use, information on the sector number of each first sector in spare blocks which are used to replace defective blocks and information on a spare area.

Some information included in the DMA can be immediately read and used. On the other hand, the DMA includes information which varies with the positions and the number of defects on a disc. In addition, some information, for example, the position information of the start sector number of each zone or the position information of a logical sector number 0, can be obtained by performing an algorithm based on defect information registered in the DMA.

Four DMAs exist on each side of a disc to prevent erroneous defect management due to errors in the DMA information. Since such DMA information is closely related to a physical data sector, a recording medium such as a movable optical disc may not be compatible with two different disc recording and reproducing apparatuses when the DMA information is incorrectly written or read.

This is because, when the recording and reproducing architecture of a disc recording and reproducing apparatus (for example, a DVD-RAM recording and reproducing apparatus) is divided into a file system layer, a host interface layer for interfacing a host computer with the recording and reproducing apparatus, a physical disc recording and reproducing apparatus (or a disc drive unit) layer for recording and reproducing physical signals, and a recording medium layer, writing and reading of DMA information is performed in the physical disc recording and reproducing apparatus layer and the layers therebelow.

In an actual file system, user information to be recorded or reproduced is transmitted to a disc recording and reproducing apparatus based on only a logical sector number, and the disc recording and reproducing apparatus converts the logical sector number into a physical sector number to record or reproduce the user information. In this case, DMA information is used. Accordingly, when the DMA information has erroneously been read or written in a given disc recording and reproducing apparatus, data cannot be correctly read or written in another recording and reproducing apparatus.

Accordingly, a method of verifying that a disc recording and reproducing apparatus correctly reads DMA information recorded on a disc and correctly records DMA information on the disc for generation or update of DMA information is desired.

SUMMARY OF THE INVENTION

To solve the above problem, a first object of the present invention is to provide a method of verifying that a disc recording and reproducing apparatus normally analyzes defect management area (DMA) information in a read or write mode.

A second object of the present invention is to provide a method of verifying that a disc recording and reproducing apparatus normally analyzes the DMA information of a disc, which is generated using a blank disc and a test reference DMA mirror file which is configured to satisfy test conditions, in a read or write mode.

A third object of the present invention is to provide a method of verifying that a disc recording and reproducing apparatus normally analyzes the DMA information of a disc, the DMA information including a wrong start logical sector number (LSN) of each zone, in a read or write mode.

A fourth object of the present invention is to provide a test apparatus for testing whether a disc recording and reproducing apparatus normally analyzes DMA information in a read or write mode.

Additional objects and advantages of the invention will be set forth in part in the description which follows and, in part, will be obvious from the description, or may be learned by practice of the invention.

To achieve the above and other objects of the present invention, there is provided a method of verifying the DMA information analyzing function of a recording and reproducing apparatus which records information on or reproduces information from a disc with DMA information. The method includes operating the recording and reproducing apparatus in a read or write mode, using a test disc with test reference information, and checking whether the recording and reproducing apparatus operates in the read or write mode to verify the DMA information analyzing function of the recording and reproducing apparatus.

To achieve the above and other objects of the invention, there is also provided an apparatus for testing the DMA information analyzing function of a recording and reproducing apparatus which records information on or reproduces information from a disc with DMA information. The apparatus includes a test disc with test reference information, and a drive to be tested for analyzing DMA information recorded on the test disc when the test disc is loaded thereinto, and for attempting to perform a process in a read or write mode.

BRIEF DESCRIPTION OF THE DRAWINGS

The above objects and advantages of the present invention will become more apparent by describing in detail preferred embodiments thereof with reference to the attached drawings in which:

FIG. 1 shows the schematic configuration of a rewritable disc;

FIG. 3 shows the disc definition structure (DDS) of a defect management area (DMA) on the C-4 disc of FIG. 2;

FIG. 5 is a block diagram of the drive to be tested shown in FIG. 2.

DETAILED DESCRIPTION OF THE INVENTION

Figure 2:
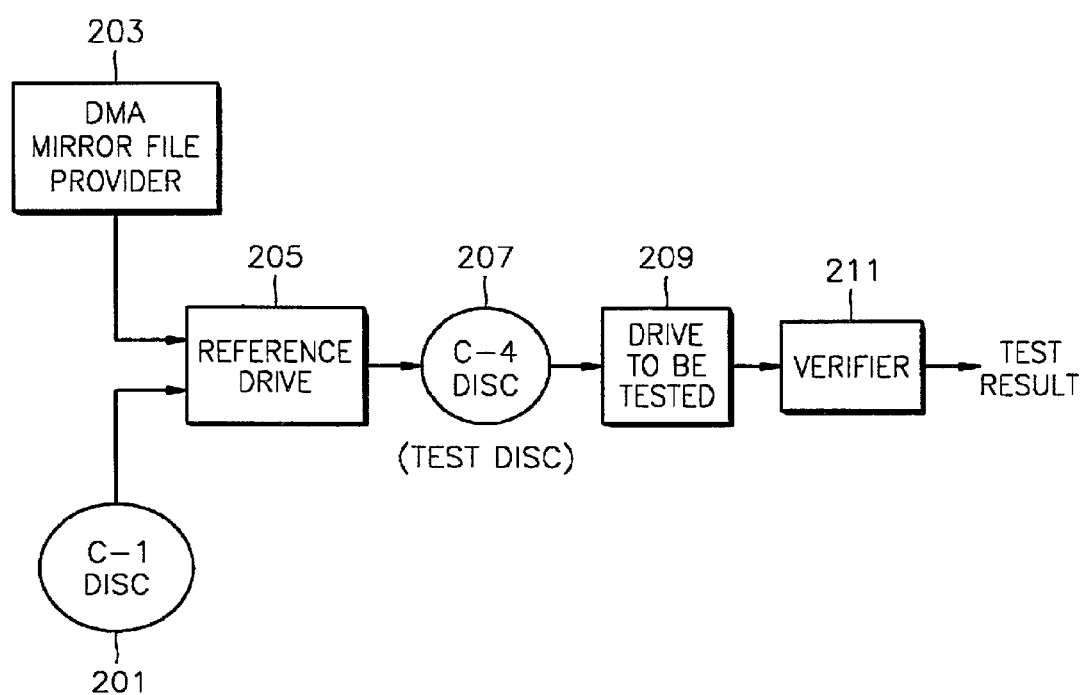
FIG. 2 is a block diagram showing the functioning of a test apparatus according to the present invention.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Referring to FIG. 2, a test apparatus includes a C-1 disc 201, a defect management area (DMA) mirror file provider 203, a reference drive 205, a C-4 disc 207, a drive to be tested 209 and a verifier 211.

The C-1 disc 201 is a test disc which is made to have intentional physical defects for the purpose of testing a disc drive which can record information on or reproduce information from a rewritable disc such as a digital versatile disc random access memory (DVD-RAM), and is substantially a blank disc on which no user data is recorded. As long as no "information" is recorded and only "intentional defects" are present on the C-1 disc 201, the C-1 disc 201 may be regarded as being blank. Accordingly, the physical defects on the C-1 disc 201 are used as known information when the disc drive is tested. In addition, the C-1 disc 201 is designed to satisfy conditions of a phase change recording DVD-RAM which has a capacity of 4.7 gigabytes (GB) prescribed in the "DVD Specifications for Rewritable Disc Version 2.0."

The DMA mirror file provider 203 provides a test reference DMA mirror file which includes disc definition structure (DDS) information, primary defect list (PDL) information and secondary defect list (SDL) information, as shown in FIG. 1.

Particularly, the test reference DMA mirror file has the start logical sector number (LSN) of each zone, which is recorded wrong intentionally. Information on the start LSNs is recorded in the DDS in a DMA, as shown in FIG. 3. 35 LSNs exist when 35 zones exist on a disc. The start LSN of each zone indicates a first sector of the zone in which data is recorded in a normal state. The test reference DMA mirror file may include all kinds of defect information in addition to the wrong start LSNs of zones.

The reference drive 205 is a modified test disc recording and reproducing apparatus for testing an apparatus capable of recording information on and reproducing information from a disc. When the C-1 disc 201 is loaded into the reference drive 205 and a test reference DMA mirror file is provided from the DMA mirror file provider 203, the reference drive 205 records the test reference DMA mirror file onto the C-1 disc 201 to generate the C-4 disc 207. The test reference DMA mirror file is recorded on the C-1 disc 201 regardless of physical defects on the C-1 disc 201. Accordingly, the C-4 disc 207 includes not only the physical defects on the C-1 disc 201, but also a test reference DMA mirror file which has no relation with the physical defects. The test reference DMA mirror file recorded on the C-4 disc 207 is pre-fixed information which is known to the user. The C-4 disc 207 is designed to satisfy the conditions of a phase change recording DVD-RAM which has a capacity of 4.7 GB prescribed in the "DVD Specifications for Rewritable Disc Version 2.0."

The drive to be tested 209 is a disc recording and reproducing apparatus which can record information on and reproduce information from a rewritable disc. When the C-4 disc 207 is loaded into the drive to be tested 209, the drive to be tested 209 reads data from or writes data to the user data area. The drive to be tested 209 finds a corresponding location in the user data area based on the location of LSN0 and the location of the start LSN of each zone, which are recorded in the DMA on the C-4 disc 207, and reads data from or writes data to the user data area.

However, since the wrong start LSNs are recorded on the C-4 disc 207, the drive to be tested 209 is expected not to perform a read or write operation if it operates normally. The result of testing whether the drive to be tested 209 performs a process in a read or write mode is provided to the verifier 211.

The verifier 211 outputs a test result informing the user that the DMA analyzing function of the drive to be tested 209 is normal when a signal indicating that the read or write operation has not been performed normally is received from the drive to be tested 209. On the contrary, the verifier 211 outputs a test result informing the user that the DMA analyzing function of the drive to be tested 209 is not normal when a signal indicating that the read or write operation has been performed normally is received from the drive to be tested 209.

Alternatively, the user may be informed of the result of testing the drive to be tested 209 for performing a process in a read or write mode, through the drive to be tested 209 without using the verifier 211. For example, the user may immediately check whether the drive to be tested 209 performs a process in a read or write mode.

Figure 4:
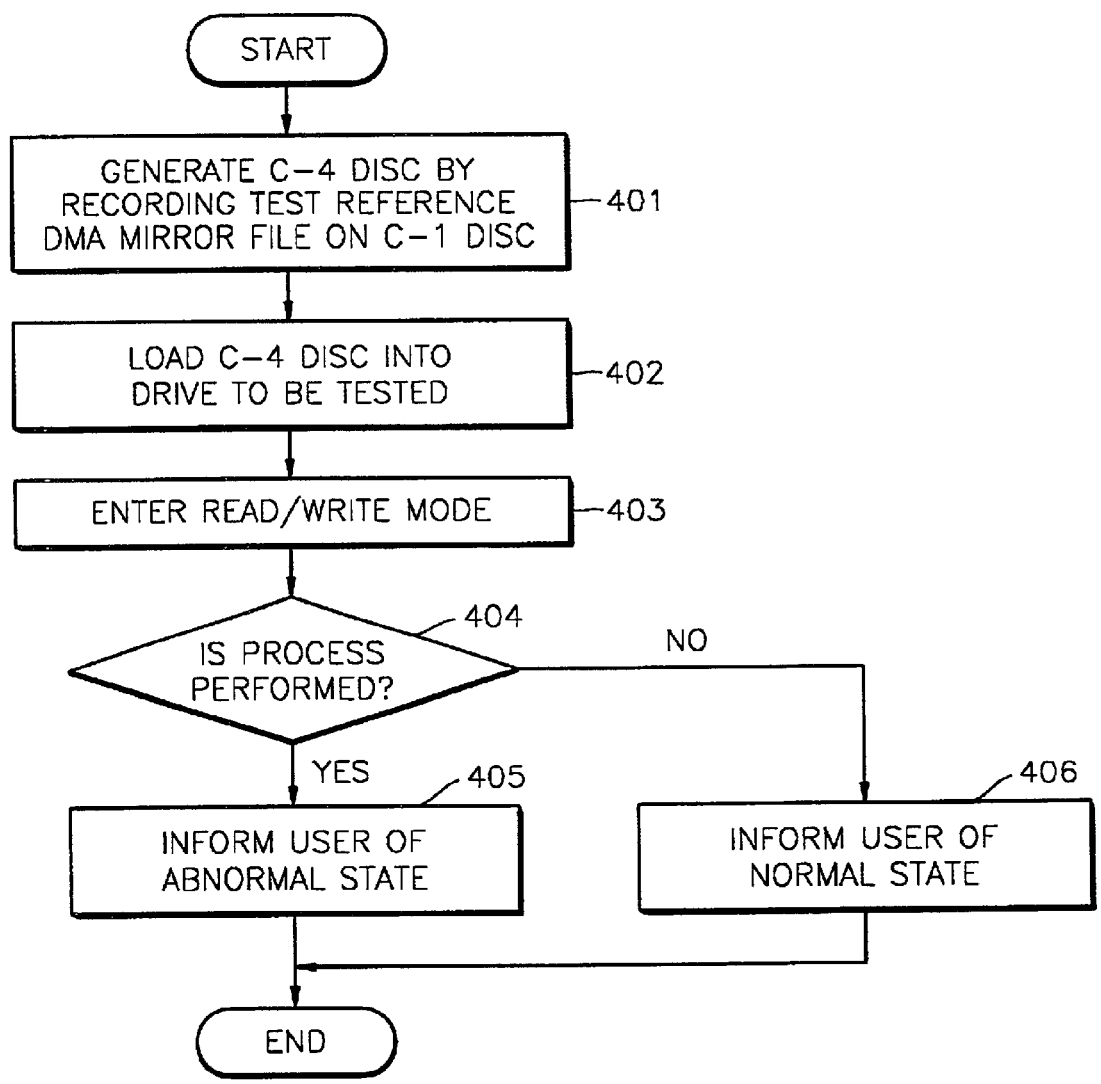
FIG. 4 is a flowchart of a verification method according to the present invention.

FIG. 4 is a flowchart of a verification method according to the present invention. The C-4 disc 207 is generated by recording the test reference DMA mirror file, which has conditions described in FIG. 2, on the C-1 disc 201, which has conditions described in FIG. 2, in operation 401.

Next, the C-4 disc 207 is loaded into the drive to be tested 209 in operation 402. The drive to be tested 209 enters a read or write mode to read data from or write data to a user data area in operation 403. Thus, the drive to be tested 209 attempts to read data from or write data to the user data area. At this time, the drive to be tested 209 uses LSN0 and the start LSNs of zones, which are recorded in the DDS in the DMA on the C-4 disc 207. As described above, since the start LSNs recorded in the DDS in test reference DMA mirror file do not match with actual LSNs in the user data area, the drive to be tested 209 is not supposed to perform the read or write operation in a normal state.

In operation 404, it is determined whether the drive to be tested 209 performs a process in the read or write mode. Thus, it is determined whether the drive to be tested 209 actually reads data from or writes data to the user data area. When the drive to be tested 209 is controlled to read data or to write data, and it is determined that the drive to be tested 209 operates to read or write the data, the user is informed that the DMA analyzing function of the drive to be tested 209 is abnormal in operation 405. On the other hand, when it is determined that the drive to be tested 209 does not perform the reading or writing process in the read or write mode, the user is informed that the DMA analyzing function of the drive to be tested 209 is normal, in operation 406.

FIG. 5 shows the drive to be tested 110 having a light source 22 to emit light, a focusing element 24 to focus the light from the light source on a disc D, and a controller 26 which controls the light source 22. The verification process described above seeks to verify the proper operation of the controller 26.

The embodiment described above can be applied to an environment in which the C-1 disc 201 and the C-4 disc 207 satisfy the Specifications for Rewritable Disc Version 2.0.

As described above, the present invention determines whether a drive to be tested performs a process in a read or write mode, using a test disc (a C-4 disc) which is generated using a blank disc and a test reference DMA mirror file having wrong start LSNs, to test the DMA analyzing function of the drive to be tested, thereby allowing the user to verify whether the DMA analyzing function of the drive to be tested is performed normally in the read or write mode. In addition, according to the present invention, the user may personally produce the test disc, thereby reducing the manufacturing cost by not requiring a manufacturer to produce and provide the test disc. The user can produce the C-4 disc using the reference drive, the DMA mirror file provider and the C-1 disc.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of verifying a defect management area (DMA) information analyzing function of a recording and/or reproducing apparatus which records information on or reproduces information from a disc with DMA information, the method comprising:
   operating the recording and/or reproducing apparatus in a read or write mode, using a test disc with test reference information included in the DMA information; and
   checking whether the recording and/or reproducing apparatus operates in the read or write mode to verify the DMA information analyzing function of the recording and/or reproducing apparatus uses the test reference information correctly.

2. The method of claim 1, wherein the test reference information is a mirror file.

3. The method of claim 1, wherein the test reference information is a DMA mirror file.

4. The method of claim 1, further comprising recording the test reference information on a blank disc to generate the test disc.

5. The method of claim 4, wherein the operating further comprises translating the DMA information recorded on the test disc when the test disc is loaded thereinto and attempting to perform a process in the read or write mode.

6. A method of verifying a defect management area (DMA) information analyzing function of a recording and/or reproducing apparatus which records information on or reproduces information from a disc with DMA information, the method comprising:
   operating the recording and/or reproducing apparatus in a read or write mode, using a test disc with test reference information; and
   checking whether the recording and/or reproducing apparatus operates in the read or write mode to verify the DMA information analyzing function of the recording and/or reproducing apparatus,
   wherein the test reference information is a DMA mirror file in which a start logical sector number of at least one zone is wrongly recorded.

7. The method of claim 6, wherein the checking comprises confirming that the recording and/or reproducing apparatus does not normally analyze DMA information on the test disc when the recording and/or reproducing apparatus operates in the read or write mode.

8. A method of verifying a defect management area (DMA) information analyzing function of a recording and/or reproducing apparatus which records information on or reproduces information from a disc with DMA information, the method comprising:
   operating the recording and/or reproducing apparatus in a read or write mode, using a test disc with test reference information; and
   checking whether the recording and/or reproducing apparatus operates in the read or write mode to verify the DMA information analyzing function of the recording and/or reproducing apparatus,
   wherein the test reference information is a DMA mirror file in which a start logical sector number for each zone is wrongly recorded.

9. An apparatus for testing a defect management area (DMA) information analyzing function of a recording and/or reproducing apparatus which records information on or reproduces information from a disc with DMA information, the apparatus comprising:
   a test disc with test reference information included in the DMA information; and
   a drive to be tested translating the DMA information recorded on the test disc when the test disc is loaded thereinto and attempting to perform a process in a read or write mode to verify the DMA information analyzing function of the drive to be tested operates correctly using the test reference information.

10. The apparatus of claim 9, wherein the test reference information is a DMA mirror file.

11. The apparatus of claim 9, further comprising a reference drive recording the test reference information on a blank disc to generate the test disc.

12. The apparatus of claim 11, wherein the reference drive records the test reference information regardless of the physical condition of the blank disc.

13. The apparatus of claim 12, wherein the test reference information comprises DMA information that does not correspond to the physical condition of the test disk such that the reference drive records the test reference information regardless of the physical condition of the blank disc.

14. An apparatus for testing a defect management area (DMA) information analyzing function of a recording and/or reproducing apparatus which records information on or reproduces information from a disc with DMA information, the apparatus comprising:
   a test disc with test reference information included in the DMA information; and
   a drive to be tested translating the DMA information recorded on the test disc when the test disc is loaded thereinto and attempting to perform a process in a read or write mode to verify the DMA information analyzing function of the drive to be tested uses the test reference information correctly, wherein the test reference information is a DMA mirror file.

15. An apparatus for testing a defect management area (DMA) information analyzing function of a recording and/or reproducing apparatus which records information on or reproduces information from a disc with DMA information, the apparatus comprising:

a test disc with test reference information; and a drive to be tested translating the DMA information recorded on the test disc when the test disc is loaded thereinto and attempting to perform a process in a read or write mode, wherein the test reference information is a DMA mirror file in which a start logical sector number of at least one zone is wrongly recorded.

16. The apparatus of claim 15, wherein the drive to be tested operates in the read or write mode when the DMA information on the test disc is not normally analyzed.

17. An apparatus for testing a defect management area (DMA) information analyzing function of a recording and/or reproducing apparatus which records information on or reproduces information from a disc with DMA information, the apparatus comprising:

a test disc with test reference information; and a drive to be tested translating the DMA information recorded on the test disc when the test disc is loaded thereinto and attempting to perform a process in a read or write mode, wherein the test reference information is a DMA mirror file in which a start logical sector number for each zone is wrongly recorded.

18. An apparatus for testing a defect management area (DMA) information analyzing function of a recording and/or reproducing apparatus which records information on or reproduces information from a disc with DMA information, the apparatus comprising:

a test disc with test reference information;

a drive to be tested translating the DMA information recorded on the test disc when the test disc is loaded thereinto and attempting to perform a process in a read or write mode; and a verifier verifying a state of the drive to be tested by checking whether the drive to be tested operates in the read or write mode when a start logical sector number of at least one zone recorded on the test disc is incorrect.

19. The apparatus of claim 18, wherein the verifier informs a user that the drive to be tested is in an abnormal state upon determining that the drive to be tested operates in the read or write mode when the start logical sector number of the at least one zone is incorrect.

20. A method of verifying a defect management area (DMA) information analyzing function of a recording and/or reproducing apparatus which records information on or reproduces information from a disc with DMA information, the method comprising:

storing test information having an incorrect start logical sector number of at least one zone on a test disc; and determining whether the recording and/or reproducing apparatus performs a process in a reading or writing mode on the test disc.

21. The method of claim 20, wherein start logical sectors of each zone are incorrect.

22. The method of claim 21, wherein the start logical sector number of the zones are recorded in a disc definition structure of a DMA on the test disc.

23. The method of claim 21, wherein the incorrect start logical sector numbers, which are stored in the disc definition structure, do not match corresponding actual start logical sector numbers in a user data area of the test disc.

24. The method of claim 20, wherein the start logical sector number of the zones are recorded in a disc definition structure of a DMA on the test disc.

25. The method of claim 20, wherein the test information is a DMA mirror file having disc definition structure, primary defect list and secondary defect list information, wherein the incorrect start logical sector number of the at least one zone is stored in the disc definition structure.

26. The method of claim 20, wherein the incorrect start logical sector number, which is stored in the disc definition structure, does not match a corresponding actual start logical sector number in a user data area of the test disc.

27. The method of claim 20, further comprising storing known physical defects on a blank disc to generate the test disc prior to storing the test information on the test disc.

28. The method of claim 27, wherein the test information is recorded on the test disc regardless of the known physical defects stored on the test disc.

29. An apparatus for verifying a defect management area (DMA) information analyzing function of a recording and/or reproducing apparatus which records information on or reproduces information from a disc with DMA information, the apparatus comprising:

a reference drive storing test information having an incorrect start logical sector number of at least one zone on a test disc;

wherein the test disc is usable to determine whether the recording and/or reproducing apparatus performs a process in a reading or writing mode on the test disc.

30. The apparatus of claim 29, further comprising:

a verifier determining whether the recording and/or reproducing apparatus performs the process in the reading or writing mode on the test disc.

31. The apparatus of claim 29, wherein whether the recording and/or reproducing apparatus performs the process in the reading or writing mode on the test disc is determinable by a user.

32. The apparatus of claim 29, wherein start logical sectors of each zone are incorrect.

33. The apparatus of claim 32, wherein the reference drive records the start logical sector number of the zones in a disc definition structure of a DMA on the test disc.

34. The method of claim 32, wherein the incorrect start logical sector numbers, which are stored in the disc definition structure, do not match corresponding actual start logical sector numbers in a user data area of the test disc.

35. The apparatus of claim 29, wherein the reference drive records the start logical sector number of the zones in a disc definition structure of a DMA on the test disc.

36. The apparatus of claim 29, wherein the test information is a DMA mirror file having disc definition structure, primary defect list and secondary defect list information, wherein the incorrect start logical sector number of the at least one zone is stored in the disc definition structure.

37. The apparatus of claim 29, wherein the incorrect start logical sector number of the at least one zone, which is stored in the disc definition structure, does not match a corresponding actual start logical sector number in a user data area of the test disc.

38. The apparatus of claim 29, wherein the test disc has known physical defects stored on a blank disc.

39. The apparatus of claim 38, wherein the reference drive records the test information on the test disc regardless of the known physical defects stored on the test disc.

40. A recording and/or reproducing apparatus verified according to the process of:
storing test information having an incorrect start logical sector number of at least one zone on a test disc; and
determining whether the recording and/or reproducing apparatus performs a process in a reading or writing mode on the test disc.

41. The apparatus of claim 40, wherein start logical sectors of each zone are incorrect.

42. A method of manufacturing a compliant recording and/or reproducing apparatus, comprising:
manufacturing an uncertified recording and/or reproducing apparatus that updates and generates defect management area (DMA) information; and
verifying whether the uncertified recording and/or reproducing apparatus is compliant with a standard, said verifying comprising:
storing test information having an incorrect start logical sector number of at least one zone on a test disc; and
determining whether the recording and/or reproducing apparatus performs a process in a reading or writing mode on the test disc.

43. The method of claim 42, wherein start logical sectors of each zone are incorrect.

44. A disc recording and/or reproducing apparatus for recording and/or reproducing information on an optical disc, comprising:
a light source to emit a light;
a focusing element to focus the light onto the optical disc to record and/or reproduce the information; and
a controller to control said light source, said controller being verified to update and generate defect management area (DMA) information by
storing test information having an incorrect start logical sector number of at least one zone on a test disc; and
determining whether the recording and/or reproducing apparatus performs a process in a reading or writing mode on the test disc.

45. The apparatus of claim 44, wherein start logical sectors of each zone are incorrect.

* * * * *